Figure 1:
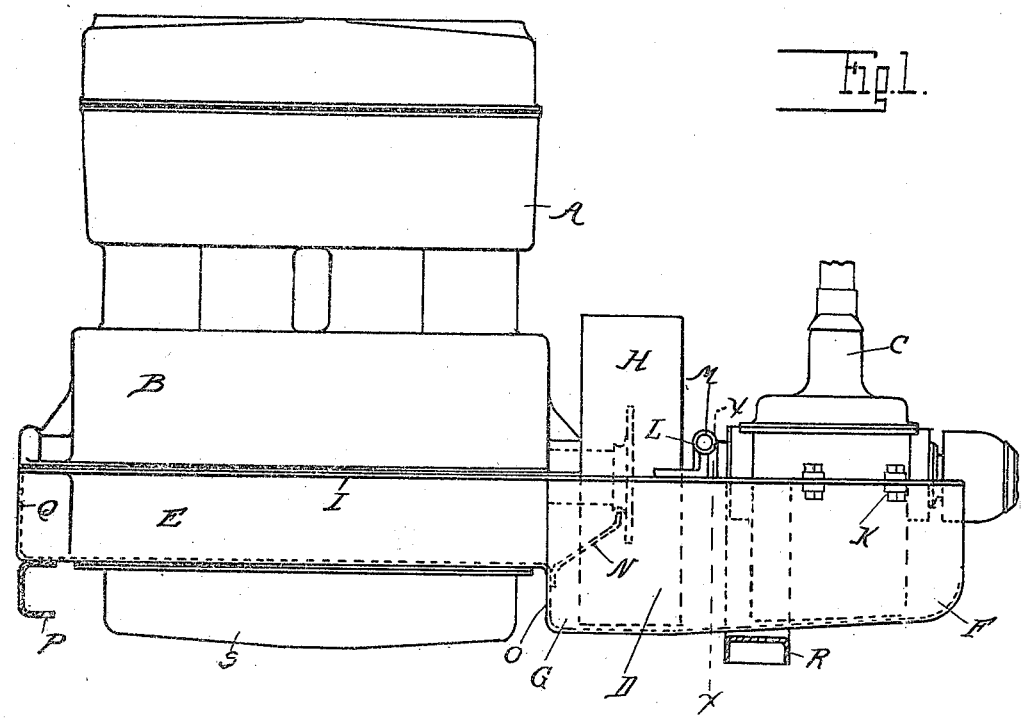

D. M. FERGUSON.
ENGINE AND TRANSMISSION UNIT.
APPLICATION FILED JULY 23, 1914.
1,167,809.
Patented Jan. 11, 1916.
2 SHEETS—SHEET 2.
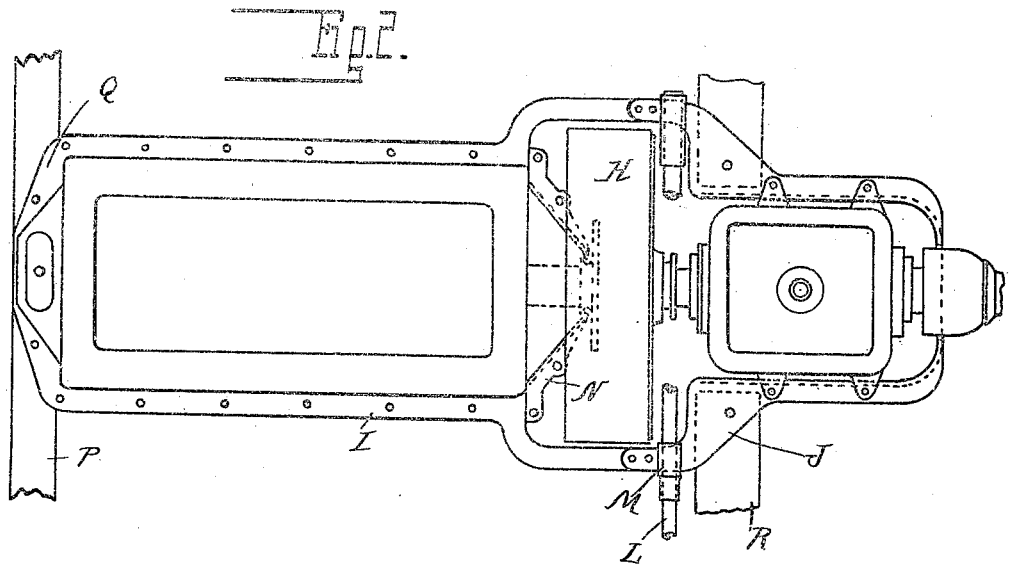
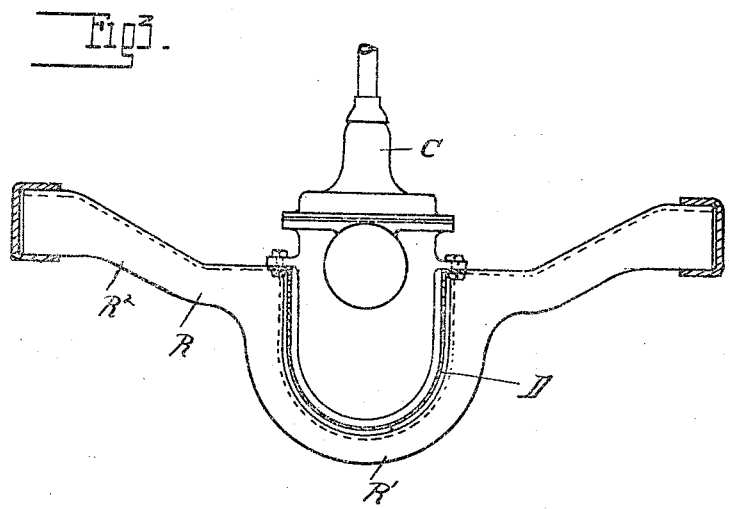

UNITED STATES PATENT OFFICE.

DONALD M. FERGUSON, OF DETROIT, MICHIGAN, ASSIGNOR TO GENERAL MOTORS COMPANY, OF DETROIT, MICHIGAN, A CORPORATION OF NEW JERSEY.

ENGINE AND TRANSMISSION UNIT.

1,167,809.  Specification of Letters Patent.  Patented Jan. 11, 1916.

Application filed July 23, 1914. Serial No. 852,581.

*To all whom it may concern:*

Be it known that I, DONALD M. FERGUSON, a citizen of the United States of America, residing at Detroit, in the county of Wayne and State of Michigan, have invented certain new and useful Improvements in Engine and Transmission Units, of which the following is a specification, reference being had therein to the accompanying drawings.

The invention relates to engine and transmission units more particularly designed for use in motor vehicles, and the invention comprises, first, the construction of a pressed sheet metal pan forming the connection between the casings of the engine and transmission mechanism, and further, in various features of construction as hereinafter set forth.

In the drawings: Figure 1 is a side elevation of the unit; Fig. 2 is a plan view with the engine casing removed; and Fig. 3 is a cross section on line $x$—$x$ Fig. 1.

In the construction of engines for motor vehicles it is customary to provide a drip pan for the oil, which in certain construction is formed of sheet metal. It is also common to form the engine and variable speed transmission as a unit having casings which are integral or rigidly attached to each other, said casings being usually formed of cast metal.

It is the object of the present invention to form the cast metal casings for the engine and the transmission distinct and separate from each other, and then to unite these parts by a pressed sheet metal member forming the oil pan and also a means for mounting upon the vehicle frame. One advantage of this construction is that the pressed pan being formed by dies will be absolutely accurate, which facilitates the proper alining of the engine and transmission mechanism. Another advantage is that it reduces the amount of machine work and thereby lessens the cost of the construction.

In detail, A is the engine casing of any suitable construction, but shown as the mono-block type.

B is the upper portion of the crank case which is integral with the casing A and which preferably terminates in the horizontal plane of the crank shaft.

C is the housing for the transmission gearing which is preferably complete in itself.

D is the pressed sheet metal pan which is fashioned to form a complementary portion E of the engine crank case, a portion F for embracing the transmission housing and an intermediate connecting portion G which also forms a partial housing for the fly-wheel H. To impart strength and rigidity to the structure it is provided with laterally-extending flanges I along the opposite sides of its upper edge, and these flanges may be increased in width at the point where the pan is narrowed from the portion G to the portion F, so as to form gussets J. The portion B of the crank case may be bolted or otherwise secured to the flanges I, and the housing C is also secured to these flanges, preferably by lugs K projecting laterally therefrom and bolted to the flanges. L is the clutch operating rock-shaft which is mounted in bearings M also secured to the flanges I.

N is a head or partition for completing the crank case and which is secured to the end of the portion E, the latter having a vertical wall O for connecting it to the expanded or enlarged portion G.

The unit is mounted upon suitable cross members of the frame, such as the channel bar P passing beneath the forward end Q of the pan and the cross member R, which has a U-shaped central portion R' for embracing the portion F and laterally-extending portion R² upon which the gussets J rest.

If desired, the bottom of the portion E may be apertured and a removable pan S secured thereto, as shown.

With the construction as described the engine and transmission mechanism may be readily mounted upon the member D, with the fly-wheel H located in the enlarged connecting portion G. Inasmuch as the pan is open at the top there is nothing to prevent lowering of the assembled elements of the engine and transmission into proper position and then attaching the same to the flanges I. Thus the work of assembling is facilitated.

What I claim as my invention is:—

1. In an engine transmission unit, the combination with the upper portion of the crank case housing, of a separate transmission gearing housing, and a pressed sheet metal member having a portion forming the complementary portion of the crank case, a portion embracing and secured to the transmission casing and an enlarged intermediate portion for embracing the fly-wheel.

2. In an engine transmission unit, the combination of an engine casing including the upper portion of the crank case, a separate transmission gearing housing, a pressed sheet metal member having a portion complementary to said crank case, a portion embracing said transmission housing, and an intermediate portion expanded to receive the fly-wheel, flanges projecting laterally from the upper edges of said pressed sheet metal member forming a means of connection with said engine and transmission casing, and a supporting cross bar having a U-shaped portion for embracing said sheet metal member and a bearing for supporting and connecting to said laterally extending flanges.

3. In an engine transmission unit, the combination with separate engine and transmission casings, of a pressed sheet metal member having a portion complementary to the engine casing, a portion embracing the transmission casing, an intermediate portion expanded to receive the fly-wheel and an intermediate head or partition for separating the engine portion from the fly-wheel portion.

4. In an engine transmission unit, the combination with an engine casing and a separate transmission casing, of a pressed sheet metal member having a portion complementary to the engine case, a portion embracing the transmission casing, an intermediate portion expanded to receive the fly-wheel, and a detachable pan forming the bottom of the engine casing portion.

5. In an engine transmission unit, the combination with the upper portion of the crank case housing, of a pressed sheet metal member formed with laterally projecting flanges at each side of its upper edge, and having a portion forming the complementary portion of the crank-case, an enlarged intermediate portion for embracing the fly-wheel and a portion to receive transmission mechanism, and a supporting cross-bar having a U-shaped portion embracing said sheet metal member, and forming bearings at each side of the U-shaped portion for respectively supporting said flanges.

In testimony whereof I affix my signature in presence of two witnesses.

DONALD M. FERGUSON.

Witnesses:
 FRANK H. FLEMING,
 EUGENE D. WILLIAMSON.